US012695376B2

(12) United States Patent
Wan et al.

(10) Patent No.: US 12,695,376 B2
(45) Date of Patent: Jul. 28, 2026

(54) VOLTAGE SOURCE CONVERTER SELECTIVELY DELAYING DEAD TIME

(71) Applicant: General Electric Technology GmbH, Baden (CH)

(72) Inventors: Jiqiang Wan, Stafford (GB); Andrew Nolan, Stafford (GB); Timothy Stott, Stafford (GB)

(73) Assignee: GE VERNOVA INFRASTRUCTURE TECHNOLOGY LLC, Greenville, SC (US)

(*) Notice: Subject to any disclaimer, the term of this patent is extended or adjusted under 35 U.S.C. 154(b) by 261 days.

(21) Appl. No.: 18/306,062

(22) Filed: Apr. 24, 2023

(65) Prior Publication Data

US 2023/0353043 A1     Nov. 2, 2023

(30) Foreign Application Priority Data

Apr. 27, 2022    (EP) ..................................... 22275053

(51) Int. Cl.
H02M 1/38 (2007.01)
H02M 7/483 (2007.01)

(52) U.S. Cl.
CPC ......... H02M 1/385 (2021.05); H02M 7/4835 (2021.05)

(58) Field of Classification Search
CPC ............................ H02M 1/385; H02M 7/4835
See application file for complete search history.

(56) References Cited

U.S. PATENT DOCUMENTS

2015/0333660 A1* 11/2015 Kim ...................... H02M 7/483
                                                        363/123
2018/0287544 A1   10/2018 Kato et al.
(Continued)

FOREIGN PATENT DOCUMENTS

| CN | 102005955 B | 2/2013 |
| CN | 103401450 B | 1/2016 |
| CN | 105897098 A | 8/2016 |

(Continued)

OTHER PUBLICATIONS

Translation of CN-107994761-A by Clarivate Analytics group, Mar. 2025, 10 pages.*

(Continued)

*Primary Examiner* — Harry R Behm
(74) *Attorney, Agent, or Firm* — Eversheds Sutherland (US) LLP

(57) ABSTRACT

There is provided a switching valve for a voltage source converter, the switching valve including a number of modules, each module including at least one switching element and at least one energy storage device, each switching element and each energy storage device arranged to be combinable to selectively provide a voltage source, the switching valve including a controller programmed to selectively control the switching of the switching elements to select zero, one or more of the modules to contribute a or a respective voltage to a switching valve voltage. The controller is programmed to selectively control the switching of the switching elements to carry out a switching operation and to apply a time delay if a charging current is flowing through the modules and/or apply a time delay to a start time of the switching operation if a discharging current is flowing through the modules.

18 Claims, 5 Drawing Sheets

(56) References Cited

U.S. PATENT DOCUMENTS

| | | | | | |
|---|---|---|---|---|---|
| 2020/0161987 | A1* | 5/2020 | Gambach | .............. | H02M 7/483 |
| 2021/0320587 | A1* | 10/2021 | Yu | .......................... | H02M 3/158 |

FOREIGN PATENT DOCUMENTS

| | | | | | | |
|---|---|---|---|---|---|---|
| CN | 107994761 | A | * | 5/2018 | .............. | H02M 1/12 |
| CN | 110222426 | A | | 9/2019 | | |
| CN | 111948574 | A | | 11/2020 | | |
| CN | 112366709 | A | | 2/2021 | | |
| CN | 112398394 | A | | 2/2021 | | |
| EP | 2725700 | A1 | | 4/2014 | | |
| JP | 2016052198 | A | * | 4/2016 | | |
| JP | 2019097221 | A | * | 6/2019 | | |

OTHER PUBLICATIONS

Translation of JP 2016052198-A by Clarivate Analytics group, Mar. 2025, 24 pages.*

Translation of JP2019097221A by Clarivate Analytics group, Mar. 2025, 12 pages.*

Changjiang et al.: "Voltage balancing control of isolated modular multilevel dc-dc converter for use in dc grids with zero voltage switching", Iet Power Electronics, IET, UK, vol. 9, No. 2, Feb. 10, 2016 (Feb. 10, 2016), pp. 270-280, XP006055521, ISSN: 1755-4535, DOI: 10.1049/IET-PEL.2015.0409.

Abildgaard et al.: "Modelling and Control of the Modular Multi-level Converter (01C)", Energy Procedia, vol. 20, Jun. 20, 2012 (Jun. 20, 2012), pp. 227-236, XP028496276, ISSN: 1876-6102, DOI: 10.1016/J.EGYPRO.2012.03.023.

Changjiang et al.: "Analysis and Arm Voltage Control of Isolated Modular Multilevel DC-DC Converter with Asymmetric Branch Impedance", IEEE Transactions on Power Electronics, Institute of Electrical and Electronics Engineers, USA, vol. 32, No. 8, I Aug. 2017 (Aug. 1, 2017) , pp. 5978-5990, XP011643921, ISSN: 0885-8993, DOI: 10.1109/TPEL.2016.2618773.

Betz et al.: "Dead-time compensation for multilevel cascaded H-bridge converters with novel voltage balancing," 2009 13th European Conference on Power Electronics and Applications, Barcelona, Spain, 2009, pp. 1-10.

Extended European Search Report issued in EP Application No. 22275053.1 dated Oct. 10, 2022, 9 pages.

Communication pursuant to Article 94(3) issued in EP Application No. 22275053.1, dated Jun. 6, 2025, 10 pages.

* cited by examiner

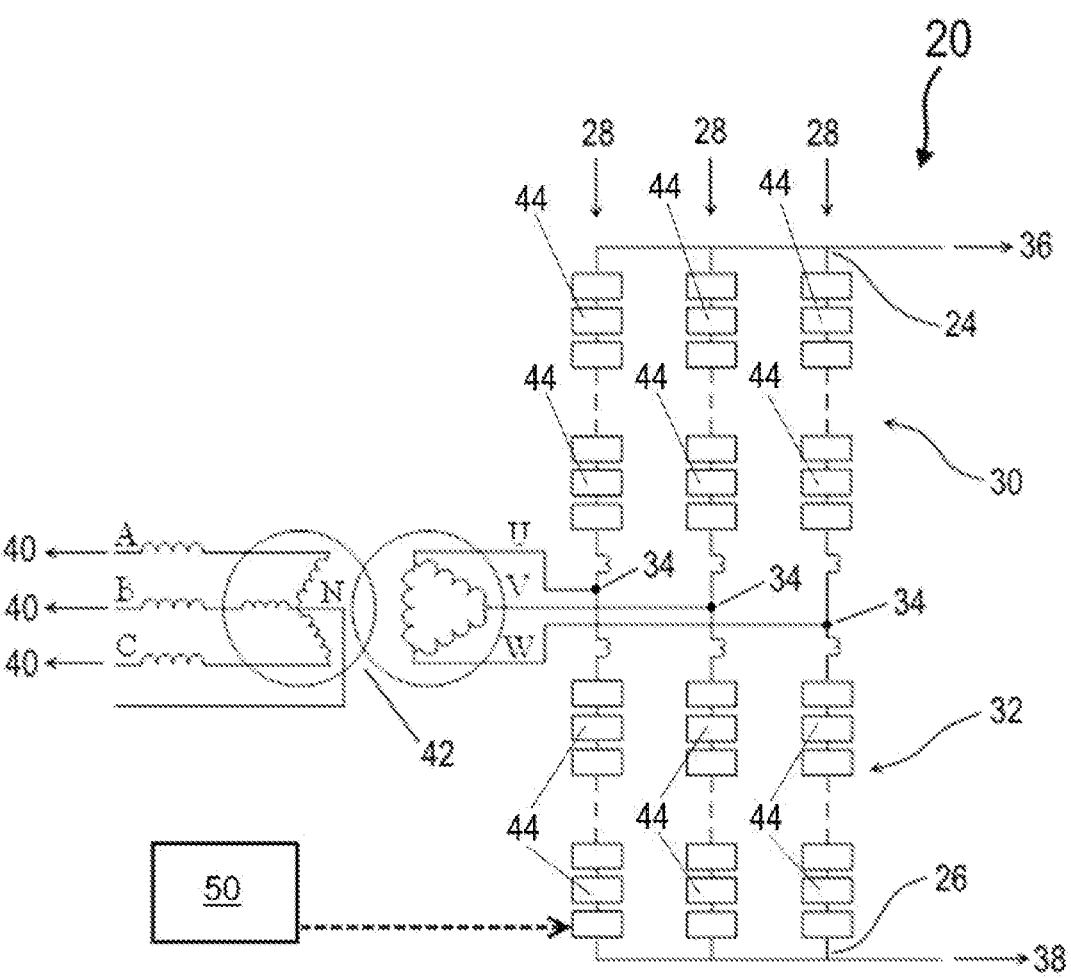
Figure 1
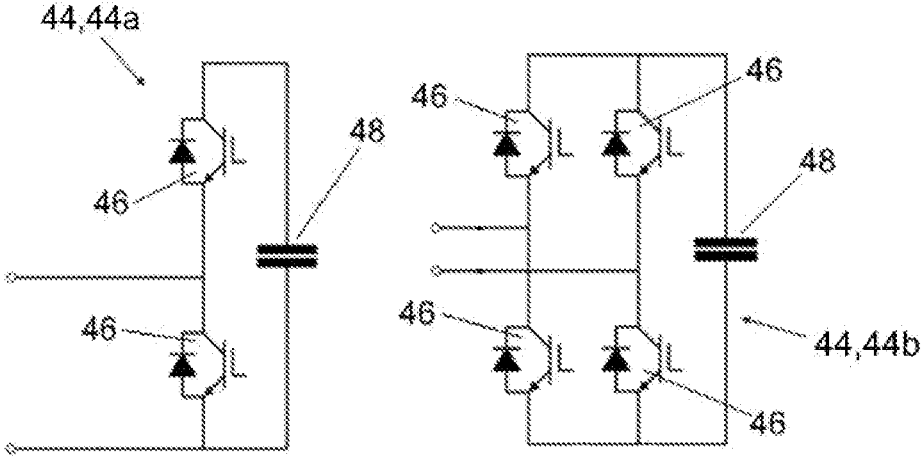
Figure 2                 Figure 3

VOLTAGE SOURCE CONVERTER SELECTIVELY DELAYING DEAD TIME

TECHNICAL FIELD

This invention relates to a switching valve for a voltage source converter, a voltage source converter, a method of operating a switching valve and a method of operating a voltage source converter, preferably for use in high voltage direct current (HVDC) transmission and reactive power compensation.

BACKGROUND OF THE INVENTION

In HVDC power transmission networks AC power is typically converted to DC power for transmission via overhead lines, under-sea cables and/or underground cables. This conversion removes the need to compensate for the AC capacitive load effects imposed by the power transmission medium, i.e. the transmission line or cable, and reduces the cost per kilometer of the lines and/or cables, and thus becomes cost-effective when power needs to be transmitted over a long distance. DC power is also transmitted directly from offshore wind parks to onshore AC power transmission networks. The conversion between DC power and AC power is utilised where it is necessary to interconnect DC and AC networks. In any such power transmission network, converters (i.e. power converters) are required at each interface between AC and DC power to affect the required conversion from AC to DC or from DC to AC.

SUMMARY OF THE INVENTION

According to a first aspect of the invention, there is provided a switching valve for a voltage source converter, the switching valve comprising a plurality of modules, each module including at least one switching element and at least one energy storage device, the or each switching element and the or each energy storage device in each module arranged to be combinable to selectively provide a voltage source, the switching valve including a controller programmed to selectively control the switching of the switching elements to select zero, one or more of the modules to contribute a or a respective voltage to a switching valve voltage, wherein the controller is programmed to selectively control the switching of the switching elements to carry out a switching operation, the switching operation including switching at least one of the modules into circuit in the switching valve and/or switching at least one of the modules out of circuit from the switching valve, wherein the controller is programmed to apply a time delay to a start time of the switching operation to switch the at least one module into circuit in the switching valve if a charging current is flowing through the modules and/or apply a time delay to a start time of the switching operation to switch the at least one module out of circuit from the switching valve if a discharging current is flowing through the modules, wherein the time delay includes a sum of a module dead-time and a switching element turn-on time reduced by a switching element turn-off time.

The above configuration of the controller to control the start time of the switching operation improves the timing of switching the or each module into circuit in the switching valve or out of circuit from the switching valve. This not only reduces the risk of unwanted voltage waveform distortion (e.g. harmonics and electrical noise) due to voltage spikes in the switching valve voltage but also improves operational accuracy by reducing the risk of having a wrong number of modules switched into circuit in the switching valve at any given time.

In a preferred embodiment of the invention, the controller may be programmed to selectively control the switching of the switching elements to simultaneously carry out first and second switching operations, the first switching operation including switching at least one first module of the modules into circuit in the switching valve, the second switching operation including switching at least one second module of the modules out of circuit from the switching valve, wherein the controller may be programmed to apply a time delay to a start time of the first switching operation if a charging current is flowing through the modules and/or apply a time delay to a start time of the second switching operation if a discharging current is flowing through the modules, wherein the time delay includes a sum of a module dead-time and a switching element turn-on time reduced by a switching element turn-off time.

The above configuration of the controller to control the start times of the first and second switching operations improves the timings of switching the or each first module into circuit in the switching valve and switching the or each second module out of circuit from the switching valve.

The time delay may be further optimised by taking into account further switching characteristics of the switching elements.

In embodiments of the invention, the switching element turn-on time may be a function of a switching element turn-on delay time and a switching element turn-on rise time. Depending on the type of switching element and the requirements of the switching valve, the switching element turn-on time may be based on the whole or a fraction of the switching element turn-on rise time.

In further embodiments of the invention, the switching element turn-off time may be a function of a switching element turn-off delay time and a switching element turn-off fall time. Depending on the type of switching element and the requirements of the switching valve, the switching element turn-off time may be based on the whole or a fraction of the switching element turn-off fall time.

The switching element turn-on delay time, turn-on rise time, turn-off delay time and turn-off fall time may vary depending on the type of switching element used in the modules.

Depending on the type of switching element and/or the vendor, the turn-on rise time may also be known as current rise time or as rise time, and the turn-off fall time may also be known as current fall time or as fall time.

The switching element turn-on delay time, turn-on rise time, turn-off delay time and turn-off fall time may be defined based on a voltage threshold, a current threshold or a combination thereof, and the magnitudes of the voltage threshold and the current threshold may vary from vendor to vendor.

An example set of definitions for an IGBT is as follows:

Turn-on delay time is the time from when the gate-emitter voltage $V_{GE}$ increases to/past 10% of its final value to when the collector current $I_c$ increases to/past 10% of its final value;

Turn-on rise time is the time for the collector current $I_c$ to increase from 10% to 90% of its final value;

Turn-off delay time is the time from when the gate-emitter voltage $V_{GE}$ decreases to/past 90% of its initial value to when the collector current $I_c$ decreases to/past 90% of its initial value;

Turn-off fall time is the time for the collector current $I_c$ to decrease from 90% to 10% of its initial value.

Another example set of definitions for an IGBT is as follows:

Turn-on delay time is the time from when the gate-emitter voltage $V_{GE}$ increases to/past 10% of its final value to when the collector current $I_c$ increases to/past 10% of its final value;

Turn-on rise time is the time for the collector-emitter voltage $V_{CE}$ to decrease from 90% to 10% of its maximum value;

Turn-off delay time is the time from when the gate-emitter voltage $V_{GE}$ decreases to/past 90% of its initial value to when the collector current $I_c$ decreases to/past 90% of its initial value;

Turn-off fall time is the time for the collector-emitter voltage $V_{CE}$ to increase from 10% to 90% of its maximum value.

Another further example set of definitions for an IGBT is as follows:

Turn-on delay time is the time from when the gate-emitter voltage $V_{GE}$ is at 0V to when the collector current $I_c$ increases to/past 10% of its final value;

Turn-on rise time is the time for the collector current $I_c$ to increase from 10% to 90% of its final value;

Turn-off delay time is the time from when the gate-emitter voltage $V_{GE}$ decreases to/past 90% of its initial value to when the collector current $I_c$ decreases to/past 90% of its initial value;

Turn-off fall time is the time for the collector current $I_c$ to decrease from 90% to 10% of its initial value.

Yet another further example set of definitions for an IGBT is as follows:

Turn-on delay time is the time from when the gate-emitter voltage $V_{GE}$ is at 0V to when the collector current $I_c$ increases to/past 10% of its final value;

Turn-on rise time is the time for the collector-emitter voltage $V_{CE}$ to decrease from 90% to 10% of its maximum value;

Turn-off delay time is the time from when the gate-emitter voltage $V_{GE}$ decreases to/past 90% of its initial value to when the collector current $I_c$ decreases to/past 90% of its initial value;

Turn-off fall time is the time for the collector-emitter voltage $V_{CE}$ to increase from 10% to 90% of its maximum value.

An example set of definitions for a MOSFET is as follows:

Turn-on delay time is the time from when the gate-source voltage $V_{GS}$ rises to/past 10% of the maximum gate-source voltage $V_{GSmax}$ to when the drain-source voltage VDS rises to/past 10% of the maximum drain-source voltage $V_{DSmax}$;

Turn-on rise time is the time for the drain-source voltage VDS to rise from 10% to 90% of the maximum drain-source voltage $V_{DSmax}$;

Turn-off delay time is the time from when the gate-source voltage $V_{GS}$ drops to/past 90% of the maximum gate-source voltage $V_{GSmax}$ to when the drain-source voltage VDS drops to/past 90% of the maximum drain-source voltage $V_{DSmax}$;

Turn-off fall time is the time for the drain-source voltage VDS to drop from 90% to 10% of the maximum drain-source voltage $V_{DSmax}$.

Another example set of definitions for a MOSFET is as follows:

Turn-on delay time is the time from when the gate-source voltage $V_{GS}$ rises to/past 10% of the maximum gate-source voltage $V_{GSmax}$ to when the drain current rises to/past 10% of a load current;

Turn-on rise time is the time for the drain current ID to rise from 10% to 90% of a load current;

Turn-off delay time is the time from when the gate-source voltage $V_{GS}$ drops to/past 90% of the maximum gate-source voltage $V_{GSmax}$ to when the drain current drops to/past 90% of a load current;

Turn-off fall time is the time for the drain current ID to drop from 90% to 10% of a load current.

In still further embodiments of the invention, each switching element may include a switching device connected in anti-parallel with a passive current check element. In such embodiments, the time delay may include a sum of a module dead-time, a switching element turn-on time and reverse recovery time reduced by a switching element turn-off time. This allows the reverse recovery time of the passive current check element to be taken into account when determining the time delay.

According to a second aspect of the invention, there is provided a voltage source converter comprising at least one switching valve according to any one of the first aspect of the invention and its embodiments. The features and advantages of the switching valve of the first aspect of the invention and its embodiments apply mutatis mutandis to the features and advantages of the voltage source converter of the second aspect of the invention and its embodiments.

The voltage source converter may include a plurality of switching valves, each of which is configured in accordance with any one of the first aspect of the invention and its embodiments.

According to a third aspect of the invention, there is provided a method of operating a switching valve, wherein the switching valve is for a voltage source converter, the switching valve comprising a plurality of modules, each module including at least one switching element and at least one energy storage device, the or each switching element and the or each energy storage device in each module arranged to be combinable to selectively provide a voltage source, the method comprising the steps of:

controlling the switching of the switching elements to select zero, one or more of the modules to contribute a or a respective voltage to a switching valve voltage;

controlling the switching of the switching elements to carry out a switching operation, the switching operation including switching at least one of the modules into circuit in the switching valve and/or switching at least one of the modules out of circuit from the switching valve, applying a time delay to a start time of the switching operation to switch the at least one module into circuit in the switching valve if a charging current is flowing through the modules and/or applying a time delay to a start time of the switching operation to switch the at least one module out of circuit from the switching valve if a discharging current is flowing through the modules, wherein the time delay includes a sum of a module dead-time and a switching element turn-on time reduced by a switching element turn-off time.

The features and advantages of the switching valve of the first aspect of the invention and its embodiments apply mutatis mutandis to the features and advantages of the method of the third aspect of the invention and its embodiments.

The method of the invention may include the steps of:

controlling the switching of the switching elements to simultaneously carry out first and second switching operations, the first switching operation including switching at least one first module of the modules into circuit in the switching valve, the second switching operation including switching at least one second module of the modules out of circuit from the switching valve, applying a time delay to a start time of the first switching operation if a charging current is flowing through the modules and/or applying a time delay to a start time of the second switching operation if a discharging current is flowing through the modules, wherein the time delay includes a sum of a module dead-time and a switching element turn-on time reduced by a switching element turn-off time.

In the method of the invention, the switching element turn-on time may be a function of a switching element turn-on delay time and a switching element turn-on rise time.

In the method of the invention, the switching element turn-off time may be a function of a switching element turn-off delay time and a switching element turn-off fall time.

As stated above, the switching element turn-on delay time, turn-on rise time, turn-off delay time and turn-off fall time may vary depending on the type of switching element used in the modules.

In the method of the invention, each switching element may include a switching device connected in anti-parallel with a passive current check element. The time delay may include a sum of a module dead-time, a switching element turn-on time and reverse recovery time reduced by a switching element turn-off time.

According to a fourth aspect of the invention, there is provided a method of operating a voltage source converter, the voltage source converter comprising at least one switching valve, the or each switching valve comprising a plurality of modules, each module including at least one switching element and at least one energy storage device, the or each switching element and the or each energy storage device in each module arranged to be combinable to selectively provide a voltage source, the method comprising the method of any one of the third aspect of the invention and its embodiments. The features and advantages of the first, second and third aspects of the invention and their embodiments apply mutatis mutandis to the features and advantages of the method of the fourth aspect of the invention and its embodiments.

Each module in the switching valve of the invention may vary in configuration, non-limiting examples of which are set out as follows.

In a first exemplary configuration of a module, the or each switching element and the or each energy storage device in the module may be arranged to be combinable to selectively provide a unidirectional voltage source. For example, the module may include a pair of switching elements connected in parallel with an energy storage device in a half-bridge arrangement to define a 2-quadrant unipolar module that can provide zero or positive voltage and can conduct current in two directions. In a second exemplary configuration of a module, the or each switching element and the or each energy storage device in the module may be arranged to be combinable to selectively provide a bidirectional voltage source. For example, the module may include two pairs of switching elements connected in parallel with an energy storage device in a full-bridge arrangement to define a 4-quadrant bipolar module that can provide negative, zero or positive voltage and can conduct current in two directions.

The plurality of modules may be connected in series to define a chain-link converter. The structure of the chain-link converter permits build-up of a combined voltage across the chain-link converter, which is higher than the voltage available from each of its individual modules, via the insertion of the energy storage devices of multiple modules, each providing its own voltage, into the chain-link converter. In this manner switching of the or each switching element in each module causes the chain-link converter to provide a stepped variable voltage source, which permits the generation of a voltage waveform across the chain-link converter using a step-wise approximation. Hence the chain-link converter is capable of providing a wide range of complex voltage waveforms.

At least one switching element may be a wide-bandgap material based switching element or a silicon semiconductor based switching element. Examples of wide-bandgap materials include, but are not limited to, silicon carbide, boron nitride, gallium nitride and aluminium nitride. At least one switching element may include at least one self-commutated switching device. The or each self-commutated switching device may be an insulated gate bipolar transistor (IGBT), a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated switching device. The number of switching devices in each switching element may vary depending on the required voltage and current ratings of that switching element. At least one switching element may further include a passive current check element that is connected in anti-parallel with the or each switching device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy to selectively provide a voltage, e.g. a capacitor, fuel cell or battery. Each module may include a single energy storage device or a plurality of energy storage devices.

The configuration of the voltage source converter may vary depending on its operating requirements. In embodiments of the invention, the voltage source converter may include at least one converter limb, the or each converter limb extending between first and second DC terminals, the or each converter limb including first and second limb portions separated by an AC terminal, each limb portion including a switching valve according to any one of the first aspect of the invention and its embodiments. In a preferred embodiment of the invention, the voltage source converter includes three converter limbs, each of which is connectable via the respective AC terminal to a respective phase of a three-phase AC network. It will be appreciated that the voltage source converter may include a different number of converter limbs, each of which is connectable via the respective AC terminal to a respective phase of an AC network with the corresponding number of phases.

It will be appreciated that the use of the terms "first" and "second", and the like, in this patent specification is merely intended to help distinguish between similar features (e.g. the first and second limb portions, etc.), and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Preferred embodiments of the invention will now be described, by way of non-limiting examples, with reference to the accompanying drawings in which:

FIG. 1 shows a voltage source converter according to an embodiment of the invention;

FIG. 2 shows a schematic view of an exemplary half-bridge chain-link module;

FIG. 3 shows a schematic view of an exemplary full-bridge chain-link module;

DETAILED DESCRIPTION

Figure 4:
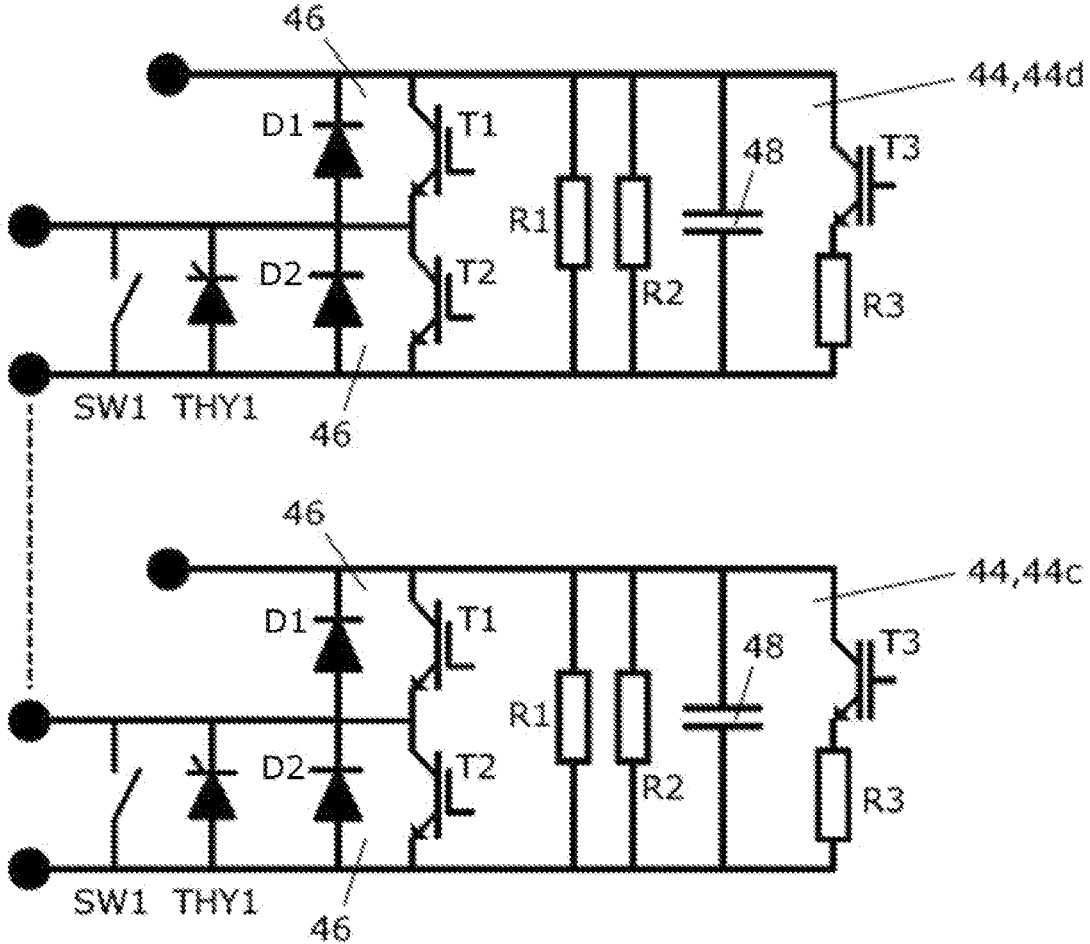
FIG. 4 shows an example configuration of first and second half-bridge modules in the same switching valve.

The figures are not necessarily to scale, and certain features and certain views of the figures may be shown exaggerated in scale or in schematic form in the interests of clarity and conciseness. The following embodiments of the invention are used primarily in AC-DC voltage source conversion in HVDC applications, but it will be appreciated that the following embodiments of the invention are applicable mutatis mutandis to other types of voltage source converters, other types of power equipment and other applications operating at different voltage levels.

A voltage source converter according to an embodiment of the invention is shown in FIG. 1 and is designated generally by the reference numeral 20. The voltage source converter 20 includes first and second DC terminals 24,26 and a plurality of converter limbs 28. Each converter limb 28 extends between the first and second DC terminals 24,26 and includes first and second limb portions 30,32 separated by a respective AC terminal 34. In each converter limb 28, the first limb portion 30 extends between the first DC terminal 24 and the AC terminal 34, while the second limb portion 32 extends between the second DC terminal 26 and the AC terminal 34. In use, the first and second DC terminals 24,26 of the voltage source converter 20 are respectively connected to a DC network 36,38. In use, the AC terminal 34 of each converter limb 28 of the voltage source converter 20 is connected to a respective AC phase of a three-phase AC network 40 via a star-delta transformer arrangement 42. It is envisaged that in other embodiments of the invention the transformer arrangement 42 may be a star-star transformer arrangement, may be another type of transformer arrangement or may be omitted altogether. The three-phase AC network 40 is an AC power grid 40.

Each limb portion 30,32 includes a switching valve, which includes a chain-link converter that is defined by a plurality of series-connected modules 44. Each module 44 may vary in topology, examples of which are described as follows. FIG. 2 shows schematically the structure of an exemplary module 44 in the form of a half-bridge module 44a. The half-bridge module 44a includes a pair of switching elements 46 and a capacitor 48. Each switching element 46 of the half-bridge module 44a is in the form of an IGBT which is connected in parallel with an anti-parallel diode. The pair of switching elements 46 are connected in parallel with the capacitor 48 in a half-bridge arrangement to define a 2-quadrant unipolar module 44a that can provide zero or positive voltage and can conduct current in both directions. FIG. 3 shows schematically the structure of an exemplary module 44 in the form of a full-bridge module 44b. The full-bridge module 44b includes two pairs of switching elements 46 and a capacitor 48. Each switching element 46 of the full-bridge module 44b is in the form of an IGBT which is connected in parallel with an anti-parallel diode. The pairs of switching elements 46 are connected in parallel with the capacitor 48 in a full-bridge arrangement to define a 4-quadrant bipolar module 44b that can provide negative, zero or positive voltage and can conduct current in both directions.

The structure of a given module 44 includes the arrangement and type of switching elements 46 and energy storage device 48 used in the given module 44. It will be appreciated that it is not essential for all of the modules 44 to have the same module structure. For example, the plurality of modules 44 may comprise a combination of half-bridge modules 44a and full-bridge modules 44b.

It is envisaged that, in other embodiments of the invention, each switching element 46 of each module 44 may be replaced by a gate turn-off thyristor (GTO), a field effect transistor (FET), a metal-oxide-semiconductor field-effect transistor (MOSFET), an injection-enhanced gate transistor (IEGT), an integrated gate commutated thyristor (IGCT), a bimode insulated gate transistor (BIGT) or any other self-commutated semiconductor device. It is also envisaged that, in other embodiments of the invention, each diode may be replaced by a plurality of series-connected diodes.

The capacitor 48 of each module 44 is selectively bypassed or inserted into the corresponding chain-link converter by changing the states of the switching elements 46. This selectively directs current through the capacitor 48 or causes current to bypass the capacitor 48, so that the module 44 provides a zero or non-zero voltage. The capacitor 48 of the module 44 is bypassed when the switching elements 46 in the module 44 are configured to form a short circuit between the two module terminals in the module 44, whereby the short circuit bypasses the capacitor 48. This causes current in the corresponding chain-link converter to pass through the short circuit and bypass the capacitor 48, and so the module 44 provides a zero voltage, i.e. the module 44 is configured in a bypassed mode. The capacitor 48 of the module 44 is inserted into the corresponding chain-link converter when the switching elements 46 in the module 44 are configured to allow the current in the corresponding chain-link converter to flow into and out of the capacitor 48.

The capacitor 48 then charges or discharges its stored energy so as to provide a non-zero voltage, i.e. the module 44 is configured in a non-bypassed mode.

In this manner the switching elements 46 in each module 44 are switchable to control flow of current through the corresponding capacitor 48.

It is possible to build up a combined voltage across each chain-link converter, which is higher than the voltage available from each of its individual modules 44, via the insertion of the capacitors of multiple modules 44, each providing its own voltage, into each chain-link converter. In this manner switching of the switching elements 46 in each module 44 causes each chain-link converter to provide a stepped variable voltage source, which permits the generation of a voltage waveform across each chain-link converter using a step-wise approximation. Hence, the switching elements 46 in each limb portion 30,32 are switchable to selectively permit and inhibit flow of current through the corresponding capacitors 48 in order to control a voltage across the corresponding limb portion 30,32. Thus, the switching of the switching elements 46 are controlled to select zero, one or more of the modules 44 to contribute a or a respective voltage to a switching valve voltage.

It is envisaged that, in other embodiments of the invention, each module 44 may be replaced by another type of module which includes at least one switching element and at least one energy storage device, the or each switching element and the or each energy storage device in each such module arranged to be combinable to selectively provide a voltage source.

It is also envisaged that, in other embodiments of the invention, the capacitor 48 in each module 44 may be replaced by another type of energy storage device which is capable of storing and releasing energy to provide a voltage, e.g. a battery or a fuel cell. It is further envisaged that each module 44 may include more than one energy storage device 48.

The voltage source converter 20 further includes a controller 50 programmed to control the switching of the switching elements 46. For the purposes of simplicity, the controller 50 is exemplarily described with reference to its implementation as a single control unit. In other embodiments, the controller 50 may be implemented as a plurality of control units. The configuration of the controller 50 may vary depending on specific requirements of the voltage source converter 20. For example, the controller 50 may include a plurality of control units, each of which is configured to control the switching of the switching elements 46 of a respective one of the modules 44. Each control unit may be configured to be internal to, or external of, the corresponding module 44. Alternatively, the controller may include a combination of one or more control units internal to the corresponding module 44 and one or more control units external of the corresponding module 44. Each control unit may be configured to communicate with at least one other control unit via telecommunications links.

In order to transfer power between the DC and AC networks 36,38,40, the controller 50 controls the switching of the switching elements 46 of the modules 44 to switch the capacitors 48 of the respective limb portions 30,32 into and out of circuit between the respective DC and AC terminals 24,26,34 to interconnect the DC and AC networks 36,38,40. The controller 50 switches the switching elements 46 of the modules 44 of each limb portion 30,32 to provide a stepped variable voltage source between the respective DC and AC terminals 24,26,34 and thereby generate a voltage waveform so as to control the configuration of an AC voltage waveform at the corresponding AC terminal 34 to facilitate the transfer of power between the DC and AC networks 36,38,40.

The controller 50 employs a switching algorithm strategy in the form of a module selection process to select the most appropriate modules 44 based on their voltage levels to contribute their voltages so that each switching valve presents a respective switching valve voltage that corresponds to a control voltage reference at any point in time.

Preferably the voltage contributing modules 44 are selected to enable balancing of the voltage levels of the modules 44. This is to prevent drift of the voltage levels of the modules 44, which may result in an overvoltage or undervoltage in one or more of the modules 44.

During the operation of the voltage source converter 20, each module 44 is switched into circuit in the corresponding switching valve and out of circuit from the corresponding switching valve. Under certain conditions (such as balancing of the voltage levels of the modules 44), a first switching operation to switch a number of first modules 44 (e.g. 0, 1 or more) into circuit in a given switching valve may be carried out simultaneously with a second switching operation to switch a number of second modules 44 (e.g. 0, 1 or more) out of circuit from the same switching valve, so that the switching valve generates the switching valve voltage that corresponds to the control voltage reference.

However, due to physical characteristics of the switching elements 46, the switching of the first and second modules 44 do not take place instantaneously. Furthermore, there is a module dead-time in which both IGBTs T1, T2 of both the first and second modules 44 are controlled to be turned off. As a result, there may be an intermediate period during which both first and second modules 44 may be temporarily switched into circuit in the switching valve or switched out of circuit from the switching valve. This not only results in a wrong number of modules 44 switched into circuit in the switching valve, thus providing an incorrect switching valve voltage, but also causes voltage waveform distortion, such as unwanted harmonics and electrical noise, in the switching valve voltage.

The foregoing switching issues are explained with reference to FIGS. 4 to 10. FIG. 4 shows an example configuration of first and second half-bridge modules 44,44c,44d in the same switching valve. It will be appreciated that the first and second half-bridge modules 44c,44d may be connected next to each other or that there may be one or more intermediate modules 44 between the first and second half-bridge modules 44c,44d. A first switching element 46 of each half-bridge module 44c,44d is in the form of a first IGBT T1 which is connected in parallel with a first anti-parallel diode D1. A second switching element 46 of each half-bridge module 44c,44d is in the form of a second IGBT T2 which is connected in parallel with a second anti-parallel diode D2. Each half-bridge module 44c,44d is connected in parallel with a protection circuit, which comprises a mechanical switch SW1 and a thyristor THY1 connected in parallel. Each half-bridge module 44c,44d includes a pair of resistors R1, R2 connected in parallel with the capacitor 48 and includes a discharge circuit connected in parallel with the capacitor 48, where the discharge circuit includes a third IGBT T3 connected in series with a resistor R3. The protection circuit, the pair of resistors R1, R2 and the discharge circuit are preferred, but not essential components, of the half-bridge modules 44c,44d.

Figure 5:
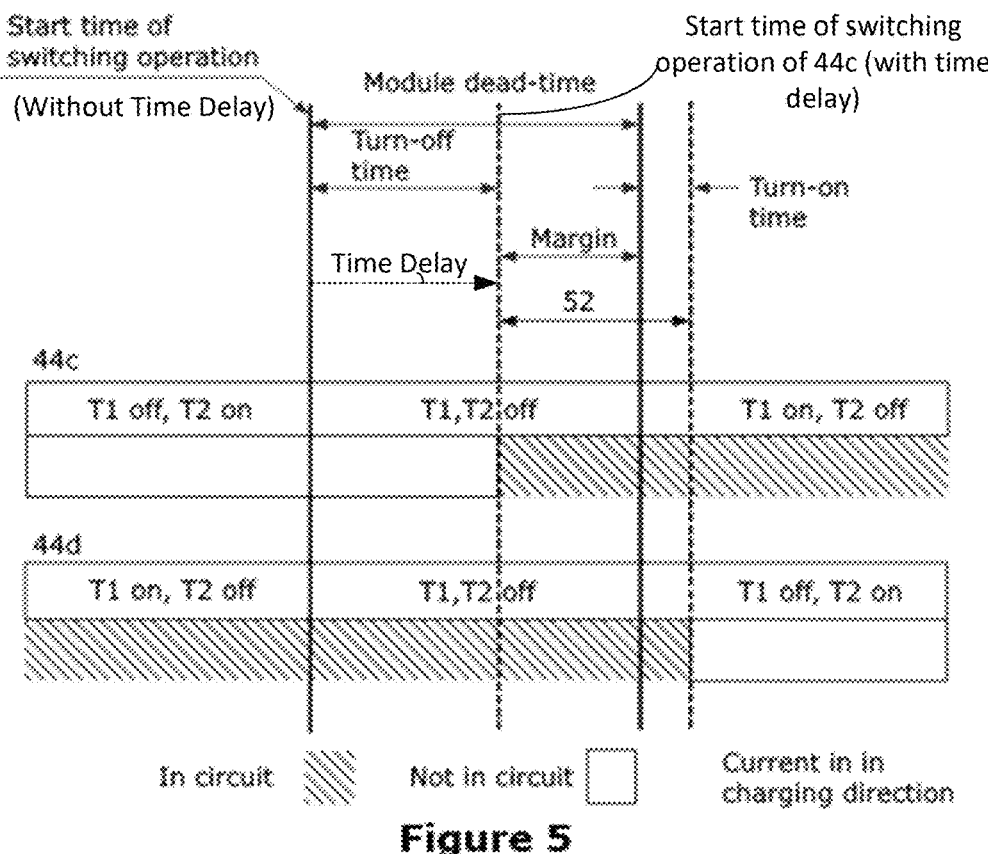
FIGS. 5 to 10 illustrates switching operations to switch a first module into circuit in a switching valve and switch a second module out of circuit from the same switching valve.

In a first example illustrated by FIG. 5, the direction of current flow in the switching valve is such that a charging current flows through the first and second modules 44c,44d. Initially the first IGBT T1 is turned off and the second IGBT T2 is turned on for the first module 44c, while the first IGBT T1 is turned on and the second IGBT T2 is turned off for the second module 44d. At this point in time the first module 44c is not contributing a voltage to the switching valve voltage, i.e. it is switched out of circuit from the switching valve, and the second module 44d is contributing a voltage to the switching valve voltage, i.e. it is switched into circuit in the switching valve.

The first and second switching operations are then commenced to:

> switch the first module 44c into circuit in the switching valve by turning on the first IGBT T1 and turning off the second IGBT T2; and
>
> switch the second module 44d out of circuit from the switching valve by turning off the first IGBT T1 and turning on the second IGBT T2.

Conventionally the start times of the first and second switching operations are the same. After the start time, there is a module dead-time in which both IGBTs T1, T2 of both the first and second modules 44c,44d are controlled to be turned off. After being triggered to turn off, the second IGBT T2 of the first module 44c initially remains conductive for part of the module dead-time for a period corresponding to a turn-off time of the second IGBT T2, and so the first module 44c remains switched out of circuit from the switching valve during this period. After the end of the turn-off time, both first and second IGBTs T1, T2 of the first module 44c are completely turned off. However, due to the charging current now flowing through the capacitor 48 via the first diode D1 of the first module 44c, the first module 44c is switched into circuit in the switching valve for the remainder of the module dead-time. Due to the charging current flowing through the capacitor 48 via the first diode D1 of the second module 44d, the second module 44d remains switched into circuit in the switching valve throughout the module dead-time.

After the end of the module dead-time, the first module 44c remains switched into circuit in the switching valve, even if the first IGBT T1 of the first module 44c is triggered to turn on but remains non-conductive as the charging current continues to flow through the first diode D1. Similarly, after the end of the module dead-time, the second IGBT T2 of the second module 44d is triggered to turn on but remains non-conductive for a period corresponding to a turn-on time of the second IGBT T2. During the period corresponding to the turn-on times, both first and second modules 44c,44d remain switched into circuit in the switching valve.

After the end of the turn-on time, the first module 44c remains switched into circuit in the switching valve, and the charging current continues to flow through the first diode D1 while the first IGBT T1 of the first module 44c is turned on and ready for when the current reverses. The second IGBT T2 of the second module 44d is turned on while the second IGBT T2 of the first module 44c and the first IGBT T1 of the second module 44d are turned off. As a result, the first module 44c stays switched into circuit in the switching valve while the second module 44d is now switched out of circuit from the switching valve.

As a result of the switching operations, both modules 44c,44d are temporarily switched into circuit in the switching valve during an intermediate period 52 that is the sum of the module dead-time and the IGBT turn-on time reduced by the IGBT turn-off time. This means that a higher than expected number of modules 44 are switched into circuit in the switching valve during the intermediate period 52. This would result in generation of a switching valve voltage that is larger than the intended switching valve voltage and the control voltage reference.

Figure 6:
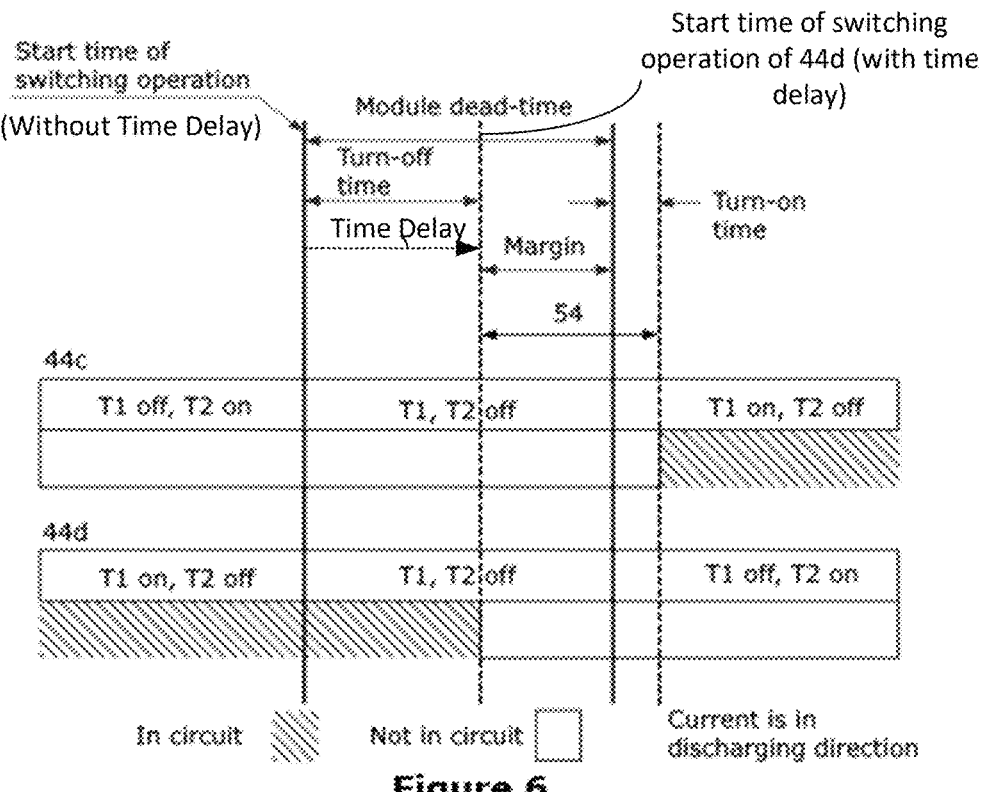

In a second example illustrated by FIG. 6, the direction of current flow in the switching valve is such that a discharging current flows through the first and second modules 44c,44d. Initially the first IGBT T1 is turned off and the second IGBT T2 is turned on for the first module 44c, while the first IGBT T1 is turned on and the second IGBT T2 is turned off for the second module 44d. At this point in time the first module 44c is not contributing a voltage to the switching valve voltage, i.e. it is switched out of circuit from the switching valve, and the second module 44d is contributing a voltage to the switching valve voltage, i.e. it is switched into circuit in the switching valve.

The first and second switching operations are then commenced to:

> switch the first module 44c into circuit in the switching valve by turning on the first IGBT T1 and turning off the second IGBT T2; and
>
> switch the second module 44d out of circuit from the switching valve by turning off the first IGBT T1 and turning on the second IGBT T2.

Conventionally the start times of the first and second switching operations are the same. After the start time, there is a module dead-time in which both IGBTs T1, T2 of both the first and second modules 44c,44d are controlled to be turned off. After being triggered to turn off, the first IGBT T1 of the second module 44d initially remains conductive for part of the module dead-time for a period corresponding to a turn-off time of the first IGBT T1, and so the second module 44d remains switched into circuit in the switching valve during this period. After the end of the turn-off time, both first and second IGBTs T1, T2 of the second module 44d are completely turned off, and so the second module 44d is switched out of circuit from the switching valve for the remainder of the module dead-time. The first module 44c remains switched out of circuit from the switching valve throughout the module dead-time.

After the end of the module dead-time, the first IGBT T1 of the first module 44c is triggered to turn on but remains non-conductive for a period corresponding to a turn-on time of the first IGBT T1. The second module 44d remains switched out of circuit from the switching valve, and the discharging current continues to flow through the second diode D2 while the second IGBT T2 of the second module 44d is turned on and ready for when the current reverses. During the period corresponding to the turn-on times, both first and second modules 44c,44d remain switched out of circuit from the switching valve.

After the end of the turn-on time, the first IGBT T1 of the first module 44c and the second IGBT T2 of the second module 44d are turned on while the second IGBT T2 of the first module 44c and the first IGBT T1 of the second module 44d are turned off. As a result, the first module 44c is now switched into circuit in the switching valve while the second module 44d stays switched out of circuit from the switching valve.

As a result of the switching operations, both modules 44c,44d are temporarily switched out of circuit from the switching valve during an intermediate period 54 that is the sum of the module dead-time and the IGBT turn-on time reduced by the IGBT turn-off time. This means that a lower than expected number of modules 44 are switched into circuit in the switching valve during the intermediate period 54. This would result in generation of a switching valve voltage that is lower than the intended valve voltage and the control voltage reference.

In order to avoid having the wrong number of modules 44 switched into circuit in the switching valve during the intermediate period 52,54 as illustrated by the first and second examples, the controller 50 is programmed to apply a time delay to a start time of the first switching operation if a charging current is flowing through the first and second modules 44c,44d or apply a time delay to a start time of the second switching operation if a discharging current is flowing through the first and second modules 44c,44d. The time delay includes a sum of the module dead-time and the IGBT turn-on time reduced by the IGBT turn-off time. Application of the time delay makes it possible to change the timings of the switching operations so as to reduce or eliminate the intermediate period 52,54 during which the wrong number of modules 44 is/are switched into circuit in the switching valve.

Figure 7:
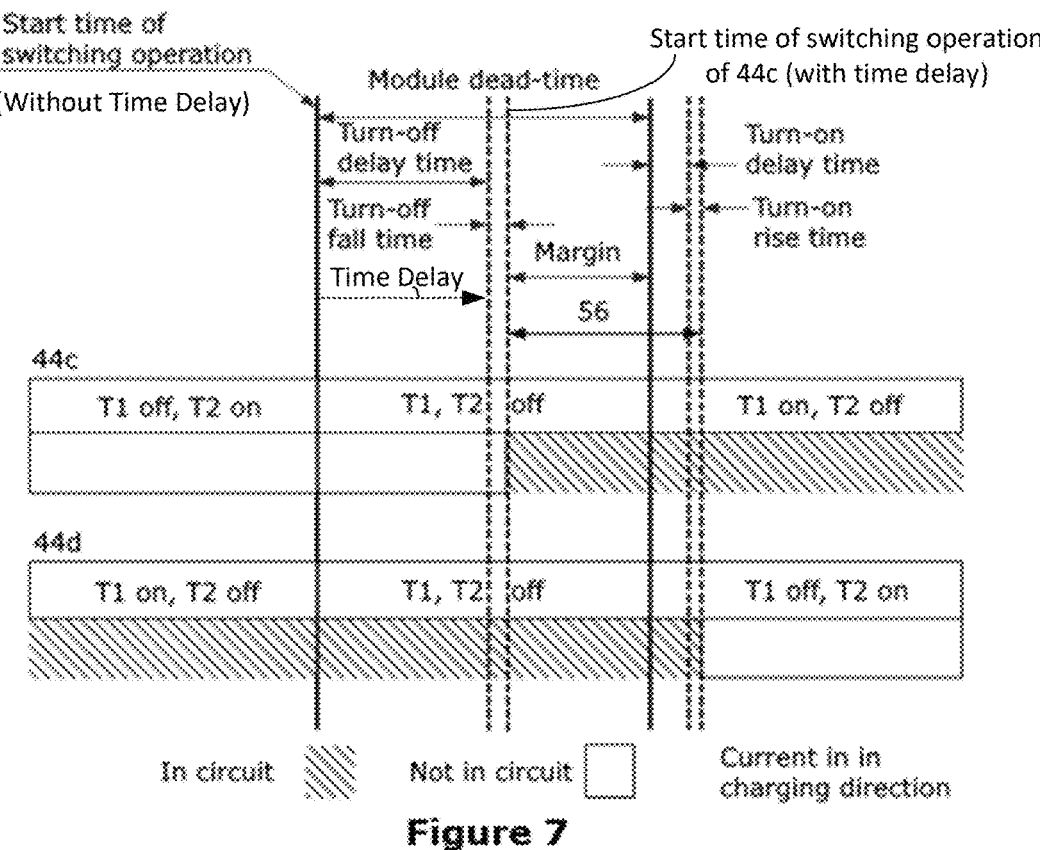

In a third example illustrated by FIG. 7, the direction of current flow in the switching valve is such that a charging current flows through the first and second modules 44c,44d. The switching behaviour of the first and second modules 44c,44d of the third example is similar to the switching behaviour of the first and second modules 44c,44d of the first example, except that the IGBT turn-off time is divided into an IGBT turn-off delay time and an IGBT turn-off fall time, while the IGBT turn-on time is divided into an IGBT turn-on delay time and an IGBT turn-on rise time.

Figure 8:
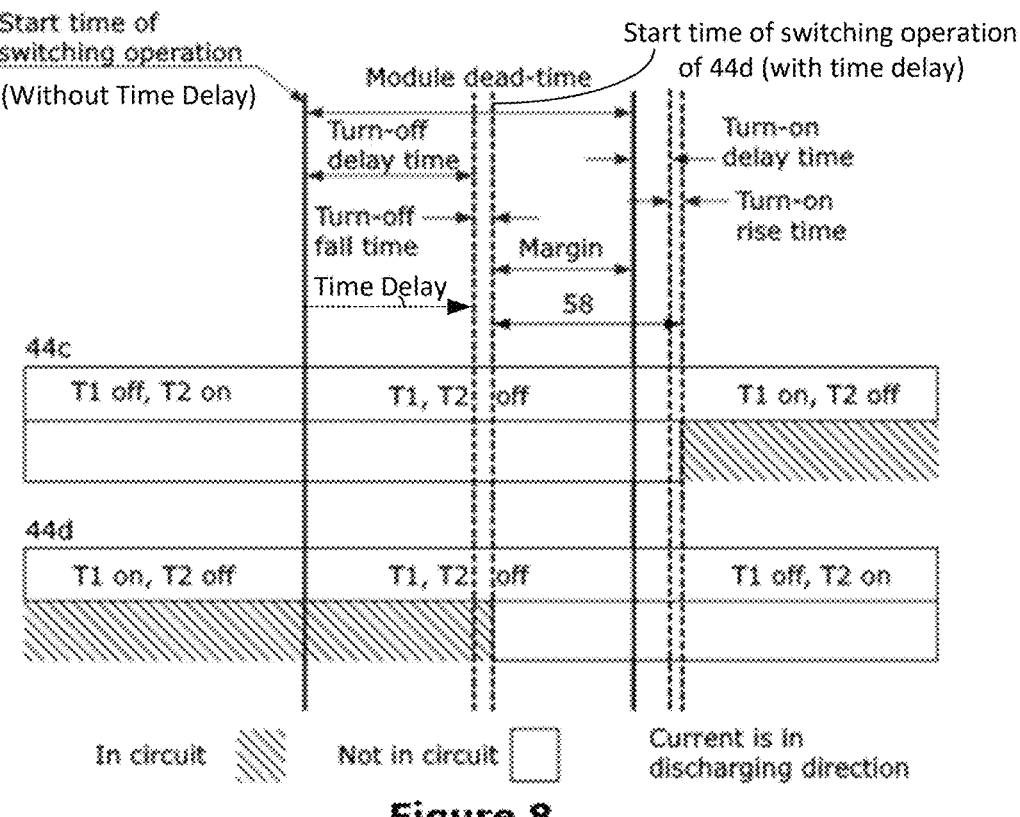

In a fourth example illustrated by FIG. 8, the direction of current flow in the switching valve is such that a discharging current flows through the first and second modules 44c,44d. The switching behaviour of the first and second modules 44c,44d of the fourth example is similar to the switching behaviour of the first and second modules 44c,44d of the second example, except that the IGBT turn-off time is divided into an IGBT turn-off delay time and an IGBT turn-off fall time, while the IGBT turn-on time is divided into an IGBT turn-on delay time and an IGBT turn-on rise time.

In order to avoid having the wrong number of modules 44 switched into circuit in the switching valve during the intermediate period 56,58 as illustrated by the third and fourth examples, the controller 50 is programmed to apply a time delay to a start time of the first switching operation if a charging current is flowing through the first and second modules 44c,44d or apply a time delay to a start time of the second switching operation if a discharging current is flowing through the first and second modules 44c,44d. The time delay includes a sum of the module dead-time, the IGBT turn-on delay time and the IGBT turn-on rise time reduced by the IGBT turn-off delay time and the IGBT turn-off fall time. Similarly to the first and second examples, application of the time delay makes it possible to change the timings of the switching operations so as to reduce or eliminate the intermediate period 56,58 during which the wrong number of modules 44 is/are switched into circuit in the switching valve.

The time delay used in the third and fourth examples allows for a more accurate control over the timings of the switching operations in comparison to the time delay used in the first and second examples. For example, in certain circumstances, the time delay may include a sum of the module dead-time, the IGBT turn-on delay time and a fraction of the IGBT turn-on rise time (e.g. half of the IGBT turn-on rise time) reduced by the IGBT turn-off delay time and a fraction of the IGBT turn-off fall time (e.g. half of the IGBT turn-off fall time).

Figure 9:
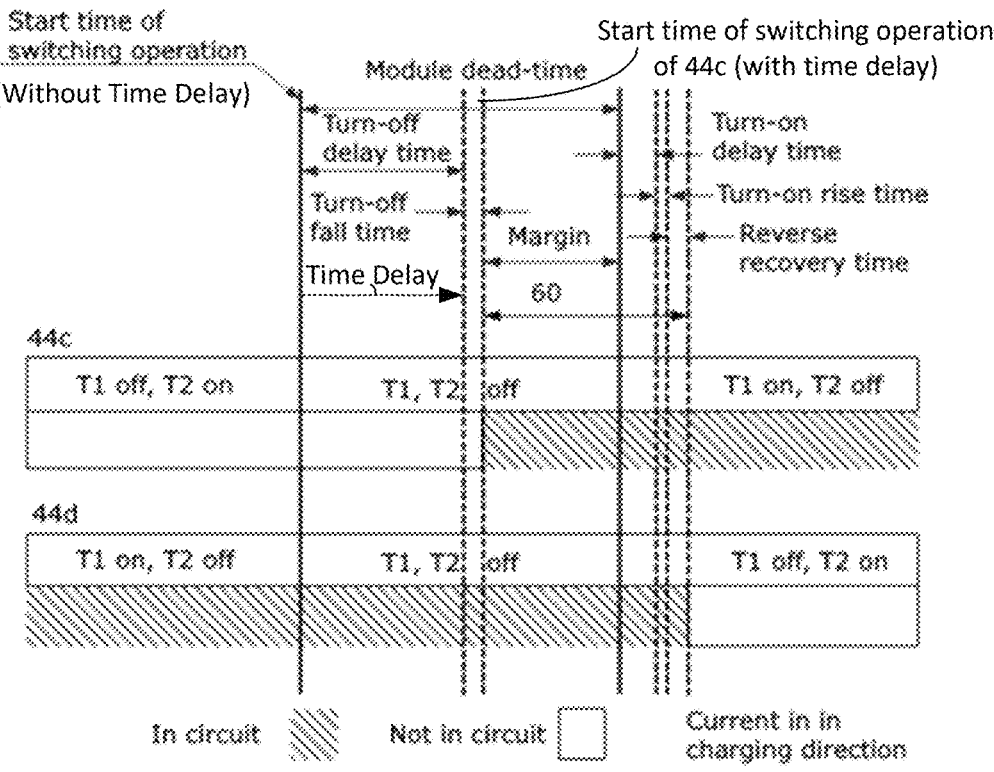

In a fifth example illustrated by FIG. 9, the direction of current flow in the switching valve is such that a charging current flows through the first and second modules 44c,44d. The switching behaviour of the first and second modules 44c,44d of the fifth example is similar to the switching behaviour of the first and second modules 44c,44d of the third example, except that the second modules 44c,44d remains switched into circuit in the switching valve for a further period after the end of the IGBT turn-on rise time where the further period corresponds to a diode reverse recovery time.

Figure 10:
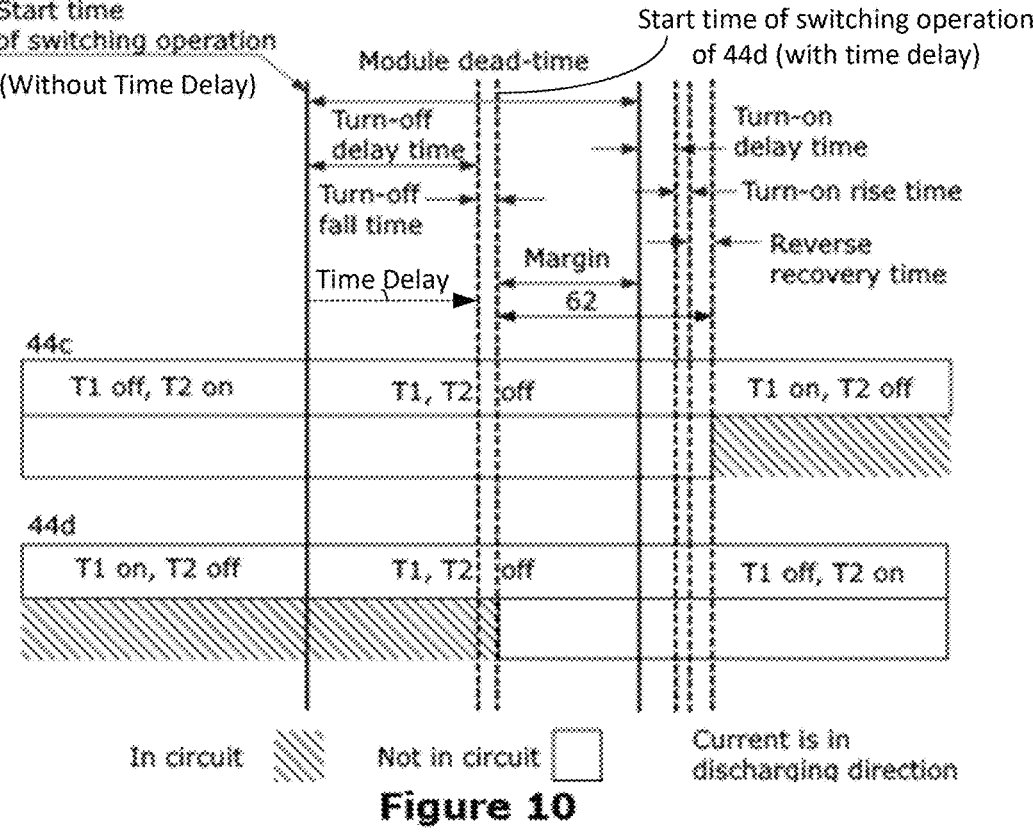

In a sixth example illustrated by FIG. 10, the direction of current flow in the switching valve is such that a discharging current flows through the first and second modules 44c,44d. The switching behaviour of the first and second modules 44c,44d of the sixth example is similar to the switching behaviour of the first and second modules 44c,44d of the fourth example, except that the first module 44c remains switched out of circuit from the switching valve for a further period after the end of the IGBT turn-on rise time where the further period corresponds to a diode reverse recovery time.

In order to avoid having the wrong number of modules 44 switched into circuit in the switching valve during the intermediate period 60,62 as illustrated by the fifth and sixth examples, the controller 50 is programmed to apply a time delay to a start time of the first switching operation if a charging current is flowing through the first and second modules 44c,44d or apply a time delay to a start time of the second switching operation if a discharging current is flowing through the first and second modules 44c,44d. The time delay includes a sum of the module dead-time, the IGBT turn-on delay time, the IGBT turn-on rise time and the diode reverse recovery time reduced by the IGBT turn-off delay time and the IGBT turn-off fall time. Similarly to the first, second, third and fourth examples, application of the time delay makes it possible to change the timings of the switching operations so as to reduce or eliminate the intermediate period 60,62 during which the wrong number of modules 44 is/are switched into circuit in the switching valve.

The application of the invention to introduce a time delay in the aforementioned first to sixth examples gradually provide a more accurate way to minimise the duration of having the wrong number of modules 44 switched into circuit in the switching valve. It will be appreciated that the introduction of the time delay can be simplified or approximated to achieve acceptable results through tuning of the time delay, without necessarily requiring exact calculations. The time delay(s) may be adjusted to a more accurate value by considering other factors, such as the level of switching valve current, temperature and variations between the same type of switching elements or different types of switching elements.

The above configuration of the controller 50 to control the start times of the first and second switching operations therefore improves the timings of switching the first module 44c into circuit in the switching valve and switching the second module 44d out of circuit from the switching valve in order to minimise or eliminate voltage waveform distortion and improve operational accuracy.

The first switching operation may involve the switching of more than one first module 44c into circuit in the switching valve. In embodiments involving more than one first module 44c, the first modules 44c may be adjacent to each other, or may not be adjacent to each other but may be distributed throughout the switching valve.

The second switching operation may involve the switching of more than one second module 44d out of circuit from the switching valve. In embodiments involving more than one second module 44d, the second modules 44d may be adjacent to each other, or may not be adjacent to each other but may be distributed throughout the switching valve.

The invention is also applicable to:

a switching operation that involves switching at least one of the modules 44 into circuit in the switching valve, where there is no simultaneous switching operation to switch at least one of the modules 44 out of circuit from the switching valve;

a switching operation that involves switching at least one of the modules 44 out of circuit from the switching valve, where there is no simultaneous switching operation to switch at least one of the modules 44 into circuit in the switching valve.

This has the benefit of avoiding the provision of a switching valve voltage by the switching valve at inconsistent times.

When the switching operation involves switching at least one of the modules 44 into circuit in the switching valve, the controller 50 is programmed to apply a time delay to a start time of the switching operation to switch the at least one module 44 into circuit in the switching valve if a charging current is flowing through the modules 44, in the same way as described above with reference to the first switching operation.

When the switching operation involves switching at least one of the modules 44 out of circuit from the switching valve, the controller 50 is programmed to apply a time delay to a start time of the switching operation to switch the at least one module 44 out of circuit from the switching valve if a discharging current is flowing through the modules 44, in the same way as described above with reference to the second switching operation.

The listing or discussion of an apparently prior-published document or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

We claim:

1. A switching valve of a limb portion of a voltage source converter, the switching valve comprising a plurality of modules, each module including at least one switching element and at least one energy storage device, the or each switching element and the or each energy storage device in each module arranged to be combinable to selectively provide a voltage source, the switching valve including a controller programmed to selectively control the switching of the switching elements to select zero, one or more of the modules to contribute a or a respective voltage to a switching valve voltage;

wherein the controller is programmed to selectively control the switching of the switching elements to carry out a switching operation, the switching operation including switching at least one of the modules into circuit in the switching valve and/or switching at least one of the modules out of circuit from the switching valve; and wherein the controller is programmed to apply a time delay to a start time of the switching operation to switch the at least one module into circuit in the switching valve based on a direction of current in the switching valve indicating that a charging current is flowing through each of the modules and/or apply the time delay to a start time of the switching operation to switch the at least one module out of circuit from the switching valve based on the direction of the current in the switching valve indicating that a discharging current is flowing through each of the modules, wherein the time delay includes a sum of a dead-time and a switching element turn-on time reduced by a switching element turn-off time, and wherein the time delay is further increased by a reverse recovery time of the switching element.

2. A switching valve according to claim 1, wherein the controller is programmed to selectively control the switching of the switching elements to simultaneously carry out first and second switching operations, the first switching operation including switching at least one first module of the modules into circuit in the switching valve, the second switching operation including switching at least one second module of the modules out of circuit from the switching valve, wherein the controller is programmed to apply the time delay to a first start time of the first switching operation if a charging current is flowing through the modules and/or apply a second time delay to a second start time of the second switching operation if a discharging current is flowing through the modules.

3. A switching valve according to claim 1, wherein the switching element turn-on time is a function of a switching element turn-on delay time and a switching element turn-on rise time.

4. A switching valve according to claim 1, wherein the switching element turn-off time is a function of a switching element turn-off delay time and a switching element turn-off fall time.

5. A switching valve according to claim 1, wherein each switching element includes a switching device connected in anti-parallel with a passive current check element.

6. A switching valve according to claim 1, wherein the time delay includes a sum of a module dead-time, a switching element turn-on time and reverse recovery time reduced by a switching element turn-off time.

7. A voltage source converter comprising at least one switching valve according to claim 1.

8. A switching valve according to claim 1, wherein each module further includes a protection circuit comprising a mechanical switch and a thyristor connected in parallel to each other and to the voltage source.

9. A switching valve according to claim 1, wherein the voltage source is a bidirectional voltage source.

10. A switching valve according to claim 9, wherein the bidirectional voltage source comprises a 4-quadrant bipolar module configurable to provide a positive voltage, a negative voltage, or zero voltage and support bidirectional current conduction.

11. A method of operating a switching valve of a limb portion of a voltage source converter, the switching valve comprising a plurality of modules, each module including at least one switching element and at least one energy storage device, the or each switching element and the or each energy storage device in each module arranged to be combinable to selectively valve, wherein the at least one of the modules switched into circuit is a different number of modules than the at least one of the modules switched out of circuit; and provide a voltage source, the method comprising the steps of:

controlling the switching of the switching elements to select zero, one or more of the modules to contribute a or a respective voltage to a switching valve voltage;

controlling the switching of the switching elements to carry out a switching operation, the switching operation including switching at least one of the modules into circuit in the switching valve and/or switching at least one of the modules out of circuit from the switching valve; and applying a time delay to a start time of the switching operation to switch the at least one module into circuit in the switching valve based on a direction of current in the switching valve indicating that a charging current is flowing through each of the modules and/or applying the time delay to a start time of the switching operation to switch the at least one module out of circuit from the switching valve based on the direction of the current in the switching valve indicating that a discharging current is flowing through each of the modules, wherein the time delay includes a sum of a dead-time and a switching element turn-on time reduced by a switching element turn-off time, and wherein the time delay is further increased by a reverse recovery time of the switching element.

12. A method according to claim 11, including the steps of:

controlling the switching of the switching elements to simultaneously carry out first and second switching operations, the first switching operation including switching at least one first module of the modules into circuit in the switching valve, the second switching operation including switching at least one second module of the modules out of circuit from the switching valve, applying the time delay to a first start time of the first switching operation if a charging current is flowing through the modules and/or applying the time delay to a second start time of the second switching operation if a discharging current is flowing through the modules, wherein the time delay includes a sum of a module dead-time and a switching element turn-on time reduced by a switching element turn-off time.

13. A method according to claim 11, wherein the switching element turn-on time is a function of a switching element turn-on delay time and a switching element turn-on rise time.

14. A method according to claim 11, wherein the switching element turn-off time is a function of a switching element turn-off delay time and a switching element turn-off fall time.

15. A method according to claim 11, wherein each switching element includes a switching device connected in anti-parallel with a passive current check element.

16. A method according to claim 15, wherein the time delay includes a sum of a module dead-time, a switching element turn-on time and reverse recovery time reduced by a switching element turn-off time.

17. A method of operating a voltage source converter, the voltage source converter comprising at least one switching valve, the or each switching valve comprising a plurality of modules, each module including at least one switching element and at least one energy storage device, the or each switching element and the or each energy storage device in each module arranged to be combinable to selectively provide a voltage source, the method comprising the method of claim 11.

18. A method according to claim 11, wherein the voltage source is a bidirectional voltage source.

\* \* \* \* \*